W. O. BUNNELL & Q. A. GATES.
DIRECTION INDICATOR.
APPLICATION FILED SEPT. 13, 1916.

1,239,349.

Patented Sept. 4, 1917.

William O. Bunnell,
Quincy A. Gates,
Inventors

By Geo. I. Kimmel
Attorney

UNITED STATES PATENT OFFICE.

WILLIAM O. BUNNELL AND QUINCY A. GATES, OF WILKES-BARRE, PENNSYLVANIA.

DIRECTION-INDICATOR.

1,239,349.  Specification of Letters Patent.  Patented Sept. 4, 1917.

Application filed September 13, 1916.  Serial No. 119,876.

*To all whom it may concern:*

Be it known that we, WILLIAM O. BUNNELL and QUINCY A. GATES, citizens of the United States, and residents of Wilkes-Barre, in the county of Luzerne and State of Pennsylvania, have invented certain new and useful Improvements in Direction-Indicators, of which the following is a specification.

The present invention relates to signaling and has particular reference to new and useful improvements in direction indicators for motor vehicles and the like.

The primary object of our invention is to provide a novel and cheaply constructed direction indicator which may be readily applied to any of the existing type of motor vehicles without structurally altering the latter.

Another object of our invention is to provide a direction indicator of the class described which is adapted to be disposed upon the hood of an automobile or the like adjacent the forward end thereof to indicate to pedestrians the direction which the driver intends taking before negotiating a turn, whereby to avoid confusion to the pedestrian and driver and prevent accident resulting from such confusion. Our improved direction indicator is adapted to contain illuminating means for use at night.

Other objects and advantages to be derived from the use of our direction indicator will appear from the following detailed description and the claim, taken with an inspection of the accompanying drawings, in which—

Figure 1:
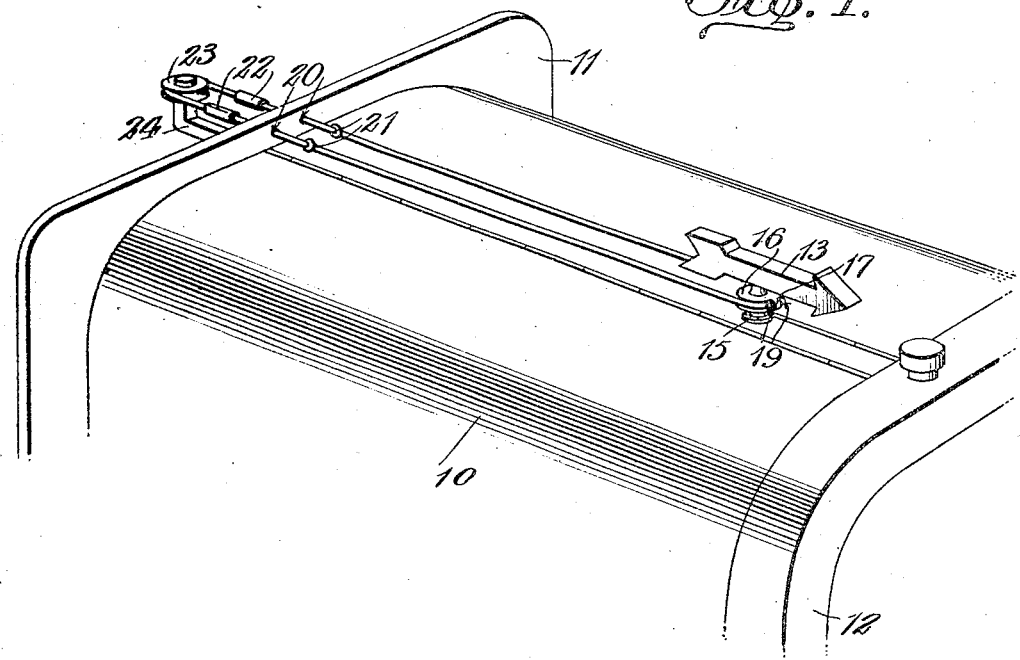
Figure 2:
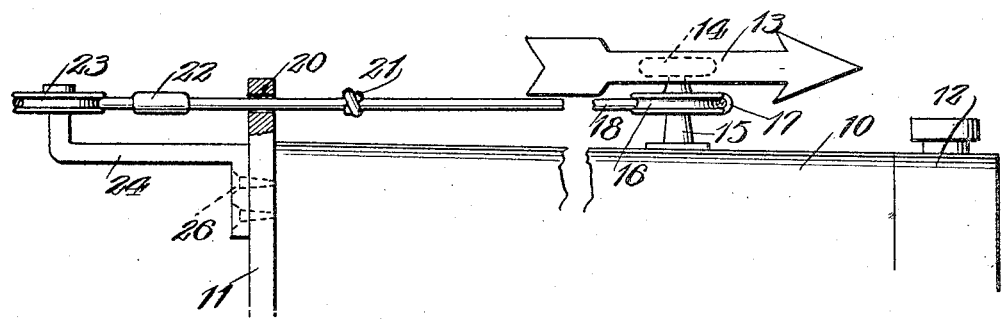

Figure 1 is a perspective view of the forward end of the motor vehicle showing our improved direction indicator applied thereto; and Fig. 2 is a side elevational view of the same, parts being shown in section.

Referring more particularly to the drawing, wherein similar characters of reference designate like and corresponding parts throughout the various views, 10 designates the engine hood of a standard type of motor vehicle, 11 the dash, and 12 the radiator all being of the conventional type.

The direction indicator of our invention includes an indicating arm 13 made in the form of an arrow, said arm being preferably transparent and provided with interiorly located light source 14. The arm 13 is mounted intermediately its length rotatably upon a standard 15, a wheel 16 being movable with said arm.

A lug 17 is formed integrally with the wheel 16, a cable 18 passing around said wheel and through the lug, the cable being knotted on both sides of the lug as indicated at 19 in Fig. 1. The parallel portions of the cable extend longitudinally along the hood and pass through openings 20 in the dash 11, said parallel portions of the cable being formed with knots 21 to limit their movement through the dash when swinging the indicator arm. Hand grips 22 are provided on the cable at the rear of the dash, said cable being trained over a pulley 23 mounted on a bearing bracket 24, said bearing bracket being mounted by means of screws 26 to the dash 11.

In use when the driver desires to indicate his intended direction of movement one of the hand grips 22 is grasped and a pull directed on the same. The knots 21 will limit the movement of the cable, such movement serving to swing the arm 13 to the right or left as the case may be. Of course the cable will be very often exposed to the weather and the knot 19 has therefore been provided to insure a positive engagement of the cable with the indicator arm. Various modifications of the device may be made such as placing the indicator arm on the radiator cap, any suitable clamp being provided for mounting the indicator arm thereon. It will be readily apparent that our improved direction indicator may be cheaply manufactured, easily applied to any of the ordinary types of automobiles and the like, and economically maintained.

From the above description taken in connection with the accompanying drawing, it is thought that a clear and comprehensive understanding of the construction, operation and advantages of our invention may be had, and while we have shown and described the device as embodying a specific structure, we desire that it be understood that such changes may be made in said structure as do not depart from the spirit and scope of the invention as claimed.

Having thus fully described our invention, what we claim as new and desire to secure by Letters Patent, is:

In a direction indicator for automobiles, the combination with a base member adapted to be positioned on the hood of the automobile adjacent the front thereof, a wheel mounted on a vertical axis on said base, an indicator arm carried by said wheel, a bracket secured to the rear side of the dash of said automobile, a pulley mounted on a vertical axis on said bracket, an endless cable trained over the wheel and pulley and extending through spaced apertures in the dash, means for connecting said cables to the wheel, handgrips on said cables between the dash and pulley for actuating the same, and stops on said cable adjacent the front of the dash for limiting the movement of the cable in given directions.

In testimony whereof, we affix our signatures hereto.

WILLIAM O. BUNNELL.
QUINCY A. GATES.